(12) United States Patent
Meek

(10) Patent No.: US 6,460,046 B1
(45) Date of Patent: Oct. 1, 2002

(54) METHOD AND SYSTEM FOR FORMING, STORING AND USING SETS OF DATA VALUES

(75) Inventor: James A. Meek, Palatine, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/323,339

(22) Filed: Jun. 1, 1999

(51) Int. Cl.[7] .......................... G06F 17/30; G01C 21/00; G06K 9/62
(52) U.S. Cl. ...................... 707/102; 707/100; 707/101; 701/200; 701/208; 701/211; 358/133
(58) Field of Search ................................. 707/102, 100, 707/101, 103, 104; 701/200, 208, 211; 358/133; 382/56

(56) References Cited

U.S. PATENT DOCUMENTS

| | | | | |
|---|---|---|---|---|
| 5,123,061 A | * | 6/1992 | Pritchard .................... | 382/56 |
| 5,140,532 A | | 8/1992 | Beckwith, Jr. et al. | |
| 5,150,209 A | * | 9/1992 | Baker et al. ................ | 358/133 |
| 5,543,789 A | | 8/1996 | Behr et al. | |
| 5,808,566 A | | 9/1998 | Behr et al. | |
| 5,968,109 A | * | 10/1999 | Israni et al. ................ | 701/208 |
| 5,995,970 A | | 11/1999 | Robinson et al. | |
| 6,047,280 A | * | 4/2000 | Ashby et al. ................. | 707/2 |
| 6,073,076 A | * | 6/2000 | Crowley et al. ............. | 701/208 |
| 6,178,377 B1 | * | 1/2001 | Ishihara et al. ............. | 701/200 |
| 6,212,474 B1 | * | 4/2001 | Fowler et al. ............... | 701/211 |
| 6,233,520 B1 | * | 5/2001 | Ito et al. ...................... | 701/208 |

FOREIGN PATENT DOCUMENTS

EP  0 838 771  5/1998

OTHER PUBLICATIONS

Web pages, The GZIP home and Introduction pages (http://www.gzip.org), pp. 1–6, (before 1998).

Web pages, GZIP, The data compression program (http://min.ethz.ch/computers/sepp/gzip–1.2.4–to/gzip.html), pp. 1–9, (before 1998).

Web pages, GNU zip, Universiteit Gent (http:///allserv.rug.ac.be/unix/software/gzip.html), p. 1 of 1, (before 1998).

Matsuyama et al., "A File Organization for Geographic Information Systems Based on Spatial Proximity" Computer Vision, Graphics and Image Processing 26:303–318 (1984).

U.S. patent application Ser. No. 09/153,996, Frederich et al., filed Sep. 17, 1998.

* cited by examiner

*Primary Examiner*—Frantz Coby
(74) *Attorney, Agent, or Firm*—Frank J. Kozak; Jon D. Shutter; Lawrence M. Kaplan

(57) ABSTRACT

A data construction for storing data efficiently and a method for forming and using the data construction is disclosed. The method comprises representing a set of actual data values from an original source of data with an alternative representation. One or more parameters of a formula are determined to approximate the set of actual data values in the original source of data. For each actual data value in the original source of data, the difference between the actual data value and the value predicted therefor by the formula is determined. The difference for each actual data value is stored in a data construction on the medium along with the one or more parameters. The alternative representation preserves the information content of the actual data values from the original source of data while reducing the storage requirements for storing the information on a medium.

22 Claims, 13 Drawing Sheets

METHOD AND SYSTEM FOR FORMING, STORING AND USING SETS OF DATA VALUES

BACKGROUND OF THE INVENTION

The present invention relates to a system and method for forming, storing, and using sets of data values, and more particularly, the present invention relates to a system and method for forming, storing, and using sets of data values as indexes for geographic data so that the amount of space required to store the information content of the data values is reduced.

Some kinds of electronic devices use data stored on a local data storage medium to provide various features and/or functions. In these kinds of electronic devices, the amount of data content that can be stored locally can affect the features and/or functionality provided by the device. Devices of this kind may include portable navigation systems (such as in-vehicle navigation systems), personal digital assistants (such as PalmPilot®-type devices), portable electronic encyclopedias, portable spell-checkers, etc. For example, portable navigation systems are available that provide end-users (such as drivers of vehicles in which the navigation systems are installed) with various navigating functions and features. Included among the features provided by some navigation systems are route calculation, route guidance, map display, and electronic yellow pages, as well as other features.

In order to provide these and other navigating features and functions, navigation systems use one or more detailed geographic databases. A geographic database includes data that represent physical features in a geographic region. For example, a geographic database used by a navigation system may include data that represents roads and intersections in a geographic region. The geographic data may include information such as the geographic coordinates along road segments, the geographic coordinates of road intersections, turn restrictions at road intersections, speed limits along the roads, street names of the various roads, address ranges along the various roads, and so on. The geographic database may also include other kinds of data. Accordingly, geographic databases used in navigation systems may include a relatively large amount of information and as a consequence geographic databases can be relatively large.

In some navigation systems, some or all the geographic data is stored locally, i.e., on a storage media physically installed with the navigation system. Various kinds of media can be used for storing the geographic database used by a navigation system. Examples of the kinds of media that may be used in navigation systems include CD-ROM disks, PCMCIA cards, and DVD disks. Other kinds of storage media may also be used. Each of these different kinds of storage media has advantages and disadvantages. For example, each of these different types of storage media has a maximum data storage capacity. Thus, for each of these different types of media, there is a maximum amount of data that can be stored on a single unit (e.g., one disk) of the media.

Regardless of the kind of media used for storing geographic data for navigation systems, it is generally desired to be able to store as much data content on the media as possible. Because a media type may have a limited maximum data storage capacity, processes that reduce or minimize the amount of space needed to store a given amount of data content can provide useful advantages. Reducing the amount of space needed to store a given amount of data content allows the saved capacity to be used for the storage of additional geographic data content. For example, the saved capacity can be used to store more details about represented geographic features. Another way that the saved capacity can be used is to increase the size of the coverage area. The coverage area of a geographic database refers to the size of the geographic region represented by the data in the geographic database. A coverage area may include an entire metropolitan area, such as New York and its suburbs, Chicago and its suburbs, or Los Angeles and its suburbs. A coverage area may also include an entire country, such as Germany. In general, it is preferable to make the coverage area as large as possible. Thus, if the amount of space needed to store a given amount of data content can be reduced, the saved capacity can be used to increase the size of the coverage area.

There are conventional data compression techniques that increase the amount of data content that can be stored on a medium. Some conventional data compression techniques have the disadvantage of requiring substantial additional processing to decompress the data from a compressed form in which it is stored on the medium into an uncompressed form that can be used by the software application that uses the data. This additional processing may adversely affect performance of some navigation systems.

Another factor that may limit utilization of conventional data compression techniques for geographic data is that some known data compression techniques may rearrange or replace some or all of the data in order to reduce the amount of space needed to store it on a medium. This kind of rearrangement or replacement may be incompatible or inconsistent with other data arrangements or organizations incorporated in the geographic database that facilitate use of the geographic data by the navigation system. For example, in order to improve navigation system performance generally and in particular to compensate for the limitations of some navigation system platforms that have limited hardware resources, arrangements and organizations can be implemented in a geographic database that facilitate access and use of the data by navigation systems. Since a navigation system uses geographic data in certain known and expected ways to perform known functions, the geographic data can be organized, structured, or arranged in ways that facilitate its use in these known ways by the navigation system. Some of the ways that geographic data can be organized, structured, or arranged to facilitate its access and use by a navigation system are described in EP 0 838 663 published Apr. 24, 1998, the entire disclosure of which is incorporated by reference herein.

As stated above, some conventional data compression techniques involve rearranging portions of the data or replacing portions of an original collection of data with other data. Such data compression techniques may be incompatible with database arrangements and organizations that enhance access and use of geographic data for performing navigation functions. Even if such conventional data compression techniques are not entirely incompatible with the navigation enhancing techniques, they may nonetheless offset the advantages associated with the navigation enhancing techniques.

As explained above, efficient storage of data can provide advantages for portable devices, such as navigation systems, that use data stored locally. Larger, non-portable systems and systems that access data from a remote location may also benefit from efficient storage of data.

Accordingly, it is one objective to provide a means to store data efficiently on a medium. It is another objective to provide a means that stores geographic data efficiently on a medium and that is compatible with organizations and structures incorporated into the geographic database that facilitate its use by a navigation system. It is another objective to provide a data compression technique that can be used for various kinds of data, including geographic data in particular.

SUMMARY OF THE INVENTION

To address the above concerns, the present invention comprises a method for storing data efficiently. The method comprises representing a set of actual data values from an original source of data with an alternative representation thereof. One or more parameters of a formula are determined to approximate the set of actual data values in the original source of data. For each actual data value in the original source of data, the difference between the actual data value and the value predicted therefor by the formula is determined. The difference for each actual data value is stored in a data construction on the medium along with the one or more parameters. The alternative representation preserves the information content of the actual data values in the original source of data while reducing the size of the storage requirements for storing the information on a medium.

According to another aspect, the present invention comprises a data construction that stores data efficiently on computer-readable medium. The data construction represents a set of actual data values from an original source of data with an alternative representation thereof. The data construction includes one or more parameters of a formula that approximates the set of actual data values in the original source of data. For each actual data value in the original source of data, the data construction includes a difference, or a representation thereof, between the actual data value and the value predicted therefor by the formula. The alternative representation preserves the information content of the actual data values in the original source of data while reducing the size of the storage requirements for storing the information on a medium.

According still another aspect, the present invention comprises a method for using data stored in a data construction that contains alternative representations of a set of actual data values from an original source of data. The method comprises accessing one or more parameters of a formula that approximates the set of actual data values in the original source of data. The method also includes the step of transforming an alternative representation from the data construction to the actual data value it represents by adding the alternative representation to a value predicted therefor by the formula.

DETAILED DESCRIPTION OF THE PRESENTLY PREFERRED EMBODIMENTS

I. Overview of Navigation System

Embodiments of the disclosed subject matter are described in connection with a navigation system. The disclosed data organization and storage arrangement can be used in other kinds of computer platforms, systems, environments, or devices, as described in more detail below.

Figure 1:
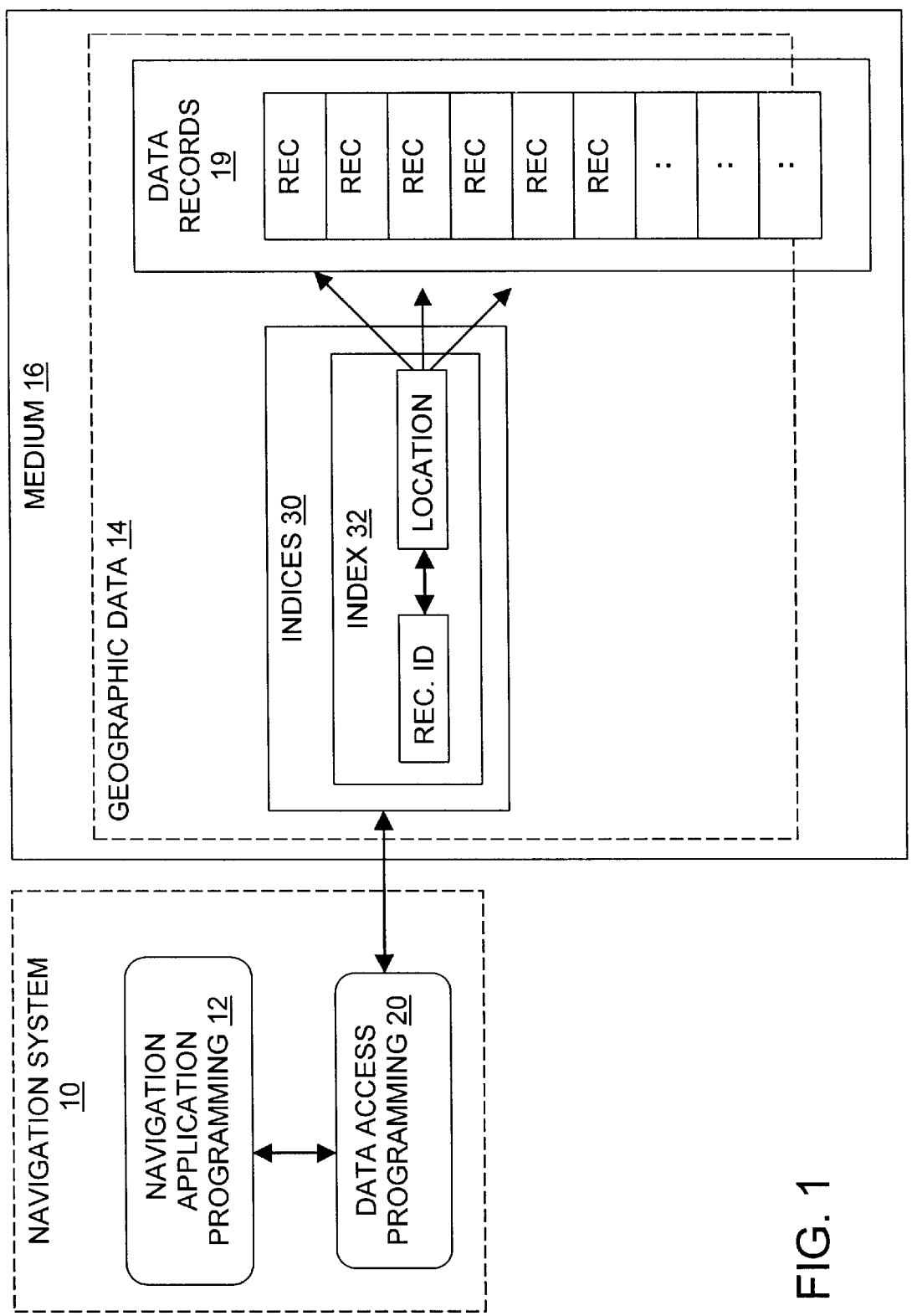
FIG. 1 is a block diagram illustrating components of a navigation system in which an embodiment of the disclosed method for storing data using an alternative representation can be incorporated.

FIG. 1 is a diagram illustrating components of a navigation system 10. The navigation system 10 may be a portable system (e.g., hand-held) or a non-portable system (e.g., desktop). The navigation system 10 may be installed in a motor vehicle.

The navigation system 10 includes navigation application programming 12. The navigation application programming 12 includes one or more software programs or routines that perform various navigation-related functions, such as map display, route calculation, etc. In order to perform these navigation-related functions, the navigation application programming 12 uses geographic data 14. In the embodiment of FIG. 1, the geographic data 14 represents physical features, such as roads, intersections, and points of interest, in a geographic area. The geographic data 14 is stored on a physical computer-readable storage medium 16. The medium 16 upon which the geographic data 14 may be stored includes one or more CD-ROM disks, PCMCIA cards, DVD disks, or hard disks. Other kinds of data storage media may also be used. In the embodiment of FIG. 1, the physical medium 16 is stored locally with the navigation system 10.

The geographic data 14 on the medium 16 may be organized in various ways. For example, the geographic data 14 may be organized into a plurality of different data types. Each of these different data types may relate to or support a different navigation-related function, such as route calculation, route guidance, map display, and so on. The geographic data may also be organized into a plurality of data records 19. Each data record may represent one or more physical features, such as roads and intersections, in a geographic area.

The navigation system 10 also includes data access programming 20. The data access programming 20 provides an interface between the navigation application programming 12 and the geographic data 14 located on the physical medium 16. The data access programming 20 is used to access and use the geographic data 14 located on the physical storage medium 16. The data access programming 20 receives requests for geographic data from the navigation application programming 12, identifies the data records 19 on the medium 16 needed to respond to the requests from the navigation application programming 12, accesses and reads data records 19 from the medium 16, performs any necessary decompression or conversion of the data from the format in which it is stored on the medium into the format required by the navigation application programming 12, and returns the requested data to the navigation application programming 12.

In order to provide the data requested by the navigation application programming 12, the data access programming 20 includes various means by which the various types and records of geographic data 14 on the medium 16 can be requested, searched, and accessed. To support these functions, the data access programming 20 uses one or more data indexes 30 to locate and access the data on the medium 16. These indexes 30 may also relate various different types of geographic data to each other, support various kinds of searches, and identify locations at which particular data records are located on the physical medium. These indexes 30 may by located on the medium 16 or may be located elsewhere.

Included among the indexes 30 is an index 32 by which geographic data on the medium can be located and accessed by record ID. Some or all of the records 19 of geographic data on the medium may be provided with record ID's. A record ID may be a unique identifier for an individual record of geographic data in the geographic database on the medium. When responding to requests from the navigation application programming 12 for geographic data, the data access programming 20 may access and read one or more specific data records identified by record ID from the medium. In order to provide this function, the access programming 20 may use the index 32. The index 32 provides for the identification of a location on the medium 16 at which the data associated with a specified record ID can be found. (The indexes 30 may also include other indexes of other types that provide for finding data on the medium 16 other than by record ID.)

Figure 2:
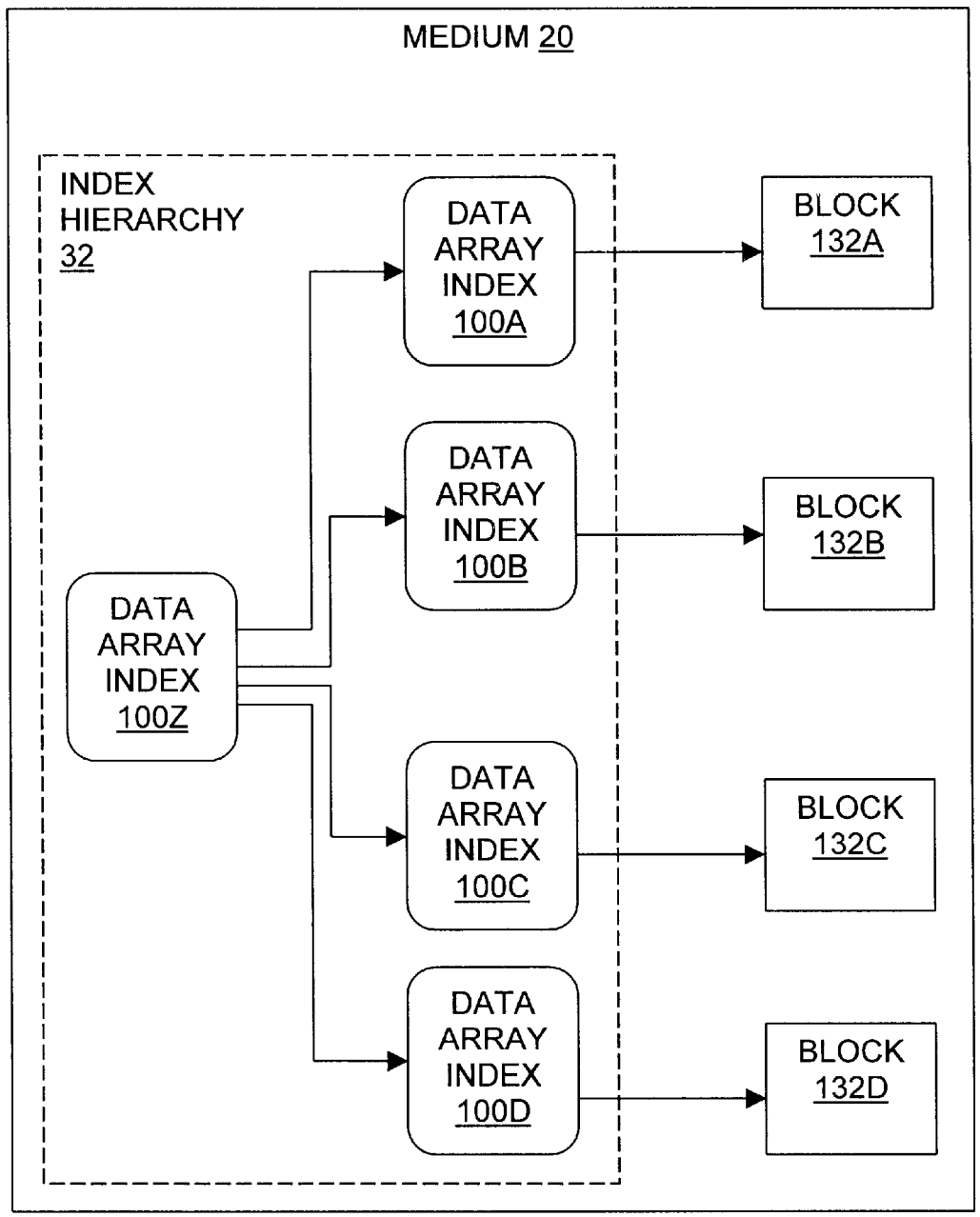
FIG. 2 is a block diagram illustrating one of the data indexes shown in FIG. 1.

FIG. 2 is a diagram illustrating one implementation of the index 32 by which the data associated with a record ID can be located on the medium. The index 32 includes a hierarchy of data arrays, including lower order data arrays 10A, 100B, 100C, and 100D and a higher order data array 100Z. Each of the lower order data arrays 10A, 1003B, 100C, and 100D associates a range of record ID's with a separate range of offsets located within separate respective blocks 132A, 132B, 132C, 132D of data located on the medium. The higher order data array 100Z provides an index into the lower order data arrays 10A, 100B, 100C, and 100D.

Each of the lower order data arrays 100A, 1003B, 100C, and 100D may be located or stored on the same physical storage medium 16 as the respective block of data for which it serves as an index, or alternatively the lower order arrays may be located or stored on another medium. Likewise, each of the lower order data arrays may be stored on the same medium as the other lower order data arrays or alternatively some or all the lower order arrays may be located or stored on different media. Likewise, the lower order data arrays may be stored on the same medium as the higher order data array or alternatively the lower order arrays and the higher order array may be located or stored on different media.

II. Alternative Representations for Data Storage

A. Basic representation of data values

Figure 3:
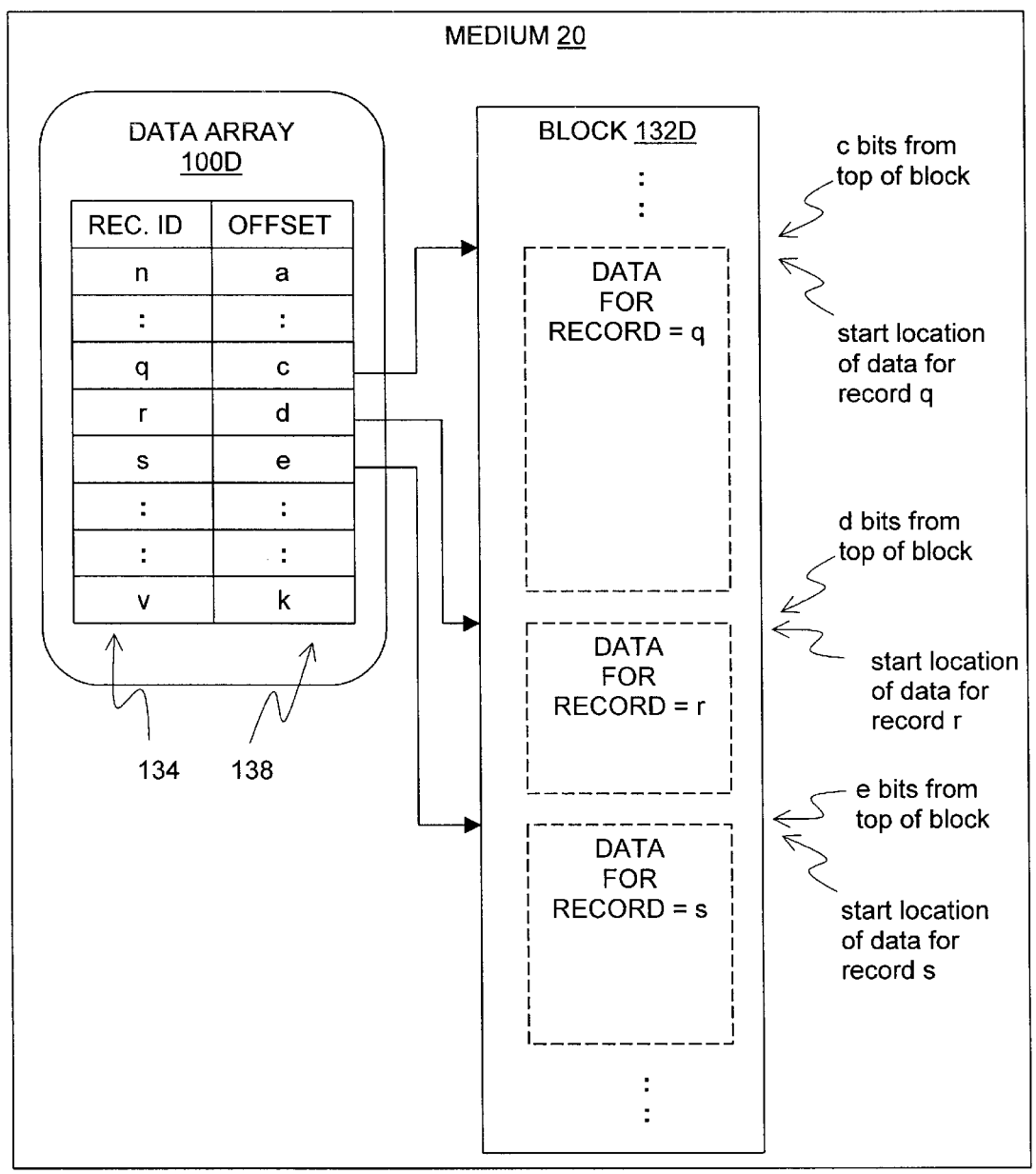
FIG. 3 is a block diagram illustrating one of the data indexes in FIG. 2 used to locate data records stored on a physical medium.

FIG. 3 shows one of the lower order data arrays 100D. The data array 100D is used as an index that associates a first set 134 of data values with a second set 138 of data values. The data values in the first set 134 are record ID's for a type of geographic data that represent physical features in a geographic region. The data values in the second set 138 are offsets to locations in the block 132D of data on the physical medium 16 (in FIG. 2) upon which the geographic data is stored and at which the data corresponding to the associated record ID's are located. The data in the first and second sets 134 and 138 can take on any values. For example, if the record ID's in the first set 134 are 14 bit numbers, the data values in the first set 134 can take on any value between 0–16383, inclusive. Likewise, if the offsets in the second set 138 are ten bit numbers, the data values in the second set 138 can take on any value between 0–1023, inclusive. (In FIG. 3, the data values in the first set 134 are represented by n . . . q, r, s . . . v and the data values in the second set 138 are represented by a . . . c, d, e . . . k. These representations are for illustration purposes and the actual values in these sets may be 14 bit numbers, ten bit numbers, etc., as stated above.)

The data values in each set may be ordered (e.g., smallest to largest) or may not be ordered. Likewise, the data values may be exclusive (e.g., no two entries in a set with the same value) or may be non-exclusive (e.g., more than one entry in a set may have the same value).

As shown in FIG. 3, the data values in the first set 134 in the array 100D comprise a first range of values, i.e., n through v, and the data values in the second set 138 comprise a second range of values, i.e., a through k. The ranges in the other lower order arrays 100A, 100B, and 100C (in FIG. 2) extend over other ranges which may or may not overlap or coincide with the range in the array 100D.

Although the data in the first and second sets 134 and 138 can take on any values within certain defined ranges, in some types of applications these sets do not necessarily include data that extend over the entire range of possible values. For example, the hierarchical index 30 depicted in FIG. 2 illustrates an example of an application in which the each of the lower order arrays 100A, 100B, 100C, and 100D contains values that may extend over only a portion (or subset) of the entire range of possible values.

B. First Alternative Representation (Simile-base-relative).

Instead of storing the actual values of the record ID's in the first set 134 of the data array 100D or the actual values of the offsets in the second set 138 of the data array 100D (such as shown in FIG. 3), it is sometimes possible to reduce the amount of space needed to store this information on the medium by using an alternative representation. In an alternative representation, the actual values in a set of data (such as record ID's, offsets, or any other data values) are replaced with different, alternative values. If these alternative values are smaller numbers (i.e., fewer bits) than the actual values that they replace, the amount of space needed to store the information can be reduced.

Figure 4:
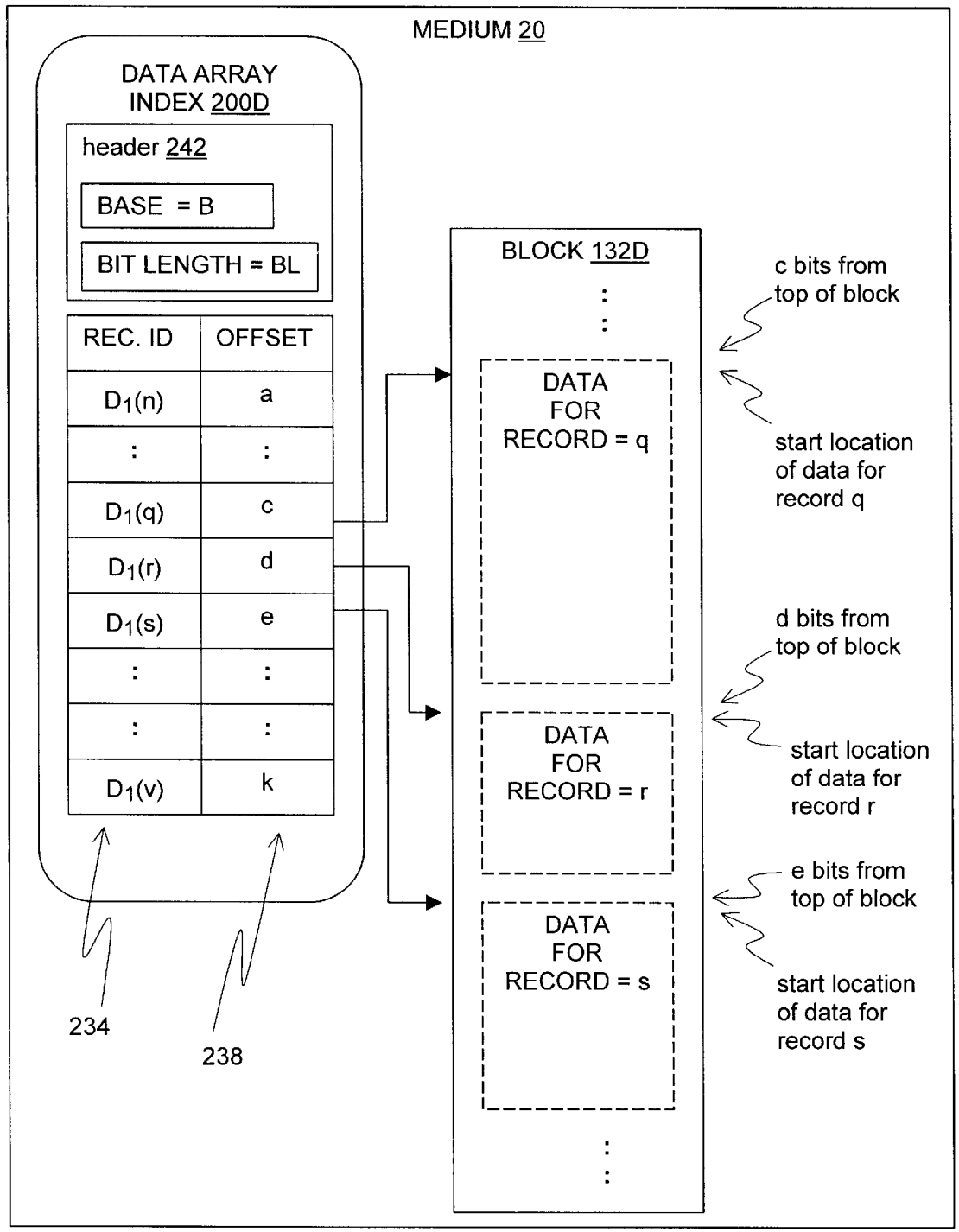
FIG. 4 is a block diagram illustrating a data array like the one in FIG. 3 in which the data values in the array are alternative representations of the actual data values, wherein the alternative representations are derived using a base relative representation.

An embodiment that uses one type of alternative representation is shown in FIG. 4. In FIG. 4, a set of actual values that define a range can be represented by identifying a base value of the range and then separately identifying each of the other actual values of the set as a difference from the base value. Thus, an actual data value, $V_O$ in a set of original data values (such as set 134 or 138 in FIG. 3) can be replaced by an alternative representation value, $D_1$, where $$D_1(V_O) = V_O - B, \quad (1)$$

(and where B is the selected base value). To use this alternative representation, instead of storing the actual values of the record ID's and/or offsets in an array on a storage medium (such as shown FIG. 3), each of the actual values in an original set of data is first transformed into an alternative representation using the transformation relationship set forth at (1), above. Then, the alternative representation values, $D_1$, are stored in an array on the storage medium. Representing each actual value of a range of values as a difference from a base value is referred to herein as a "simple base-relative" representation.

FIG. 4 shows a data array 200D in which the simple base-relative alternative representation has been implemented. In FIG. 4, the data array 200D includes a first set 234 of data values and a second set 238 of data values. The data values in the first set 234 are associated with corresponding data values in the second set 238. The first set 234 of data values represent record ID's and the second set 238 of data values represent offsets on the storage medium 20 at which the data for the records associated with the record ID's are located. In the embodiment shown in FIG. 4, the first set 234 contains the values of the record ID's which have been transformed using the transformation relationship set forth at (1), above. (The second set 238 contains the actual values of the offsets. However in alternative embodiments, the actual values of the offsets can also be replaced with alternative representations using the transformation relationship at (1), above, or another transformation relationship.)

The value of the base, B, is also stored in the data array 200D. For example, the value of the base can be stored in a header 242 of the data array 200D.

In the embodiment described in FIG. 4, the minimum number of bits needed to represent the largest difference value is computed. This difference value is referred to as the "bit length." The value of the bit length, BL, is stored in the data array 200. For example, the value of the bit length may be stored in the header 242.

In one example, if the range of actual values in an original non-transformed set of source data (such as the first set 134 in FIG. 3) is 12000 to 12345, only enough bits are needed to represent 346 (9 bits) in the simple-base-relative alternative representation of this data formed using the transformation relationship set forth at (1), above. The header 242 would include a value indicating that the base, B, is equal to "12000" and that the bit length, BL, is equal to "9."

Depending upon the range of actual data values in the original set of source data (e.g., in FIG. 3), using the simple-base-relative alternative representation for a set of data values can reduce the amount of space on the medium needed to store the information content of the original set of data values. (It is noted that the amount of space saved is offset somewhat by the need to separately store the values of the base and the bit length for the set.)

As mentioned above, both the set 234 of record ID data and the set 238 of offset data can be stored using the simple-base-relative alternative representation. Alternatively, only the data in one of the sets may be stored as an alternative representation and the data in the other set can be stored using actual values.

Note that if only a single value appears in an original source set of data, then the field length, BL, is zero bits. In this case, the information included in the header would identify the base. The bit length would be 0.

Other kinds of alternative representations can be used. Depending upon the values of the source data in the original sets of data, some of these other kinds of representations may provide additional reductions in the amount of space needed to store the information content of the original set of data.

C. Second Alternative Representation (Multiple-bases).

Figure 5:
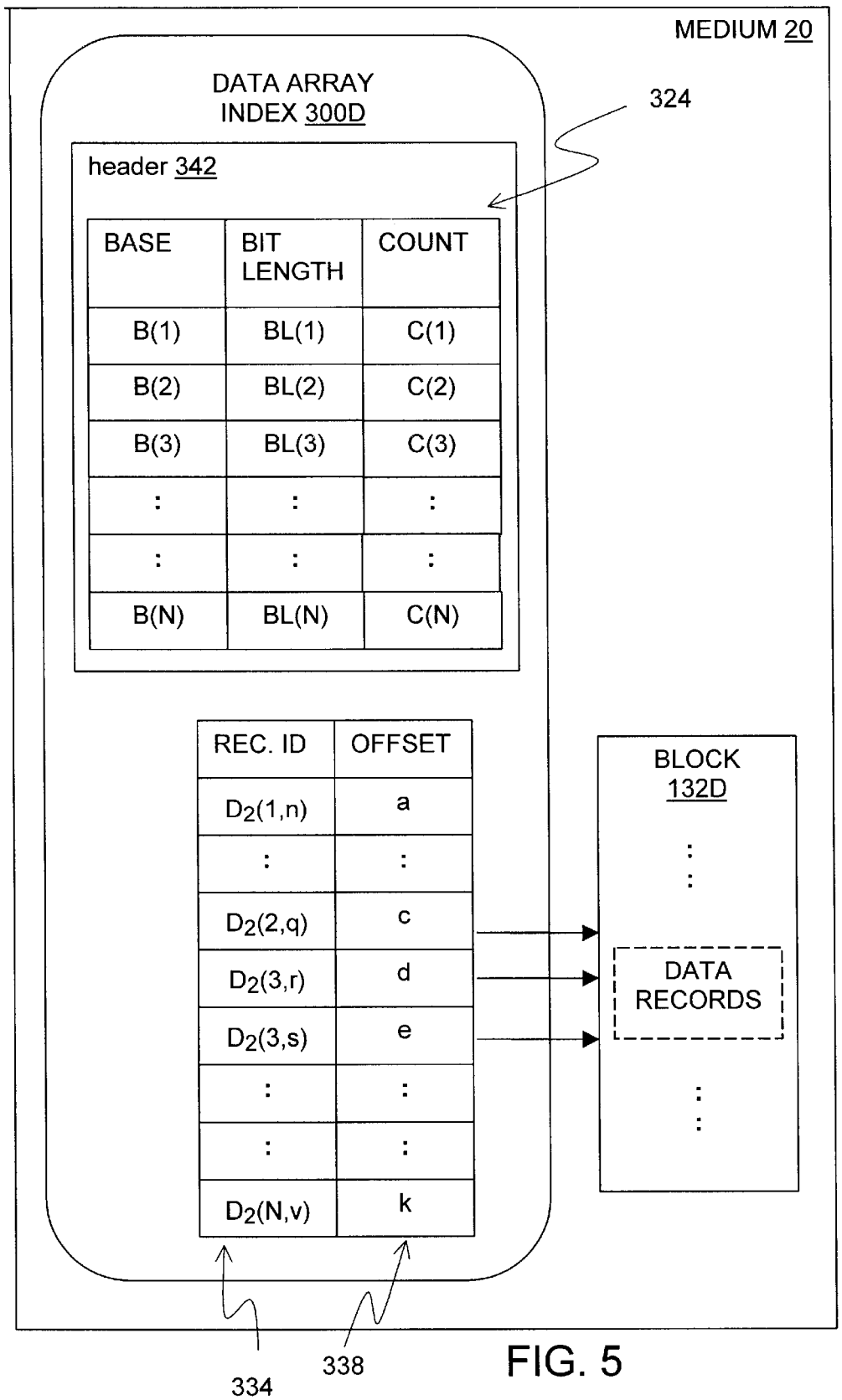
FIG. 5 is a block diagram illustrating a data array like the one in FIG. 4 in which the data values in the array are alternative representations of the actual data values, wherein the alternative representations are derived using a multiple bases relative representation.

FIG. 5 illustrates another embodiment of an alternative representation for a set of actual data values in a source of data. The embodiment in FIG. 5 can be used to reduce the amount of space required to store the information content of the set of actual data values in the source of data. The embodiment shown in FIG. 5 is similar to the embodiment shown in FIG. 4 except that a plurality of bases are used for a single original set of actual data values.

In the embodiment shown in FIG. 5, the set of actual data values in the original source data is separated into a plurality of groups. If the original set of source data includes data that occurs in clusters, these clusters can be used to form the plurality of groups. However, the embodiment shown in FIG. 5 can be used even if the original set of actual data values does not occur in clusters.

After the plurality of groups is determined, a base value is determined for each group. For example, the least (e.g., smallest) value in each group formed from the actual data values in the original source data may be selected as the base value for its group.

Associated with each of the groups is a value for a bit length. The bit length associated with each group is determined in a similar manner to the way the bit length is determined for the entire data set in the simple-base-relative alternative representation embodiment described in connection with FIG. 4.

Also associated with each of the groups is a value for a count. The count associated with each group is equal to the number of data values in the group.

After determining the bases, bit lengths, and counts for each of the plurality of groups formed from the original set of actual data values, alternative representations of the set of actual data values are determined and stored in a data array 300D. In the alternative representation shown in FIG. 5, the data array 300D includes a first set 334 of data values and a second set 338 of data values. Each of the data values in the first set 334 is associated with a corresponding data value in the second set 338. As in the previous embodiments, the data values in the first set 334 represent record ID's and the data values in the second set 338 represent offsets to location in a block of data 132D at which the data record associated with the corresponding record ID's are located.

In the embodiment shown in FIG. 5, each actual data value $V_O$ occurring in an original set of data is replaced by an alternative representation using the following transformation relationship.

$$D_2(V_O, B_N) = V_O - B_N \quad (2)$$

where $B_N$ is the base value for the group in which the original data value, $V_O$, is included. In addition to storing the alternative representations of the actual data values in the data array 300D, the values of the bases, bit lengths, and counts for each of the plurality of groups formed from the original set of actual data values are also stored in the data array 300D. The values of the base, bit length, and count for each group are associated with each other. A table 324 in a header 342 of the data array 300D may be used for this purpose. As shown in FIG. 5, the table 324 stores the values of the bases, B(1), B(2) . . . B(N), the values for the bit lengths, BL(1), BL(2) . . . BL(N), and the values for the counts, C(1), C(2) .... C(N). (The count is used to keep track of the number of alternative representation values associated with each of the plurality of base values.)

In FIG. 5, the second set 338 contains the actual values of the offsets. However in alternative embodiments, the actual values of the offsets can also be replaced with alternative representations using the transformation relationship at (2), above, or another transformation relationship.

With the embodiment shown in FIG. 5, because multiple bases are used, the range of data values used as alternative representations value can be decreased thereby resulting in savings in the amount of space needed to store the information content of the original set of actual data values. Offsetting the saving is the need to store the multiple base values and the counts in the header.

D. Third Alternative Representation (Serial Values in Source).

Figure 6:
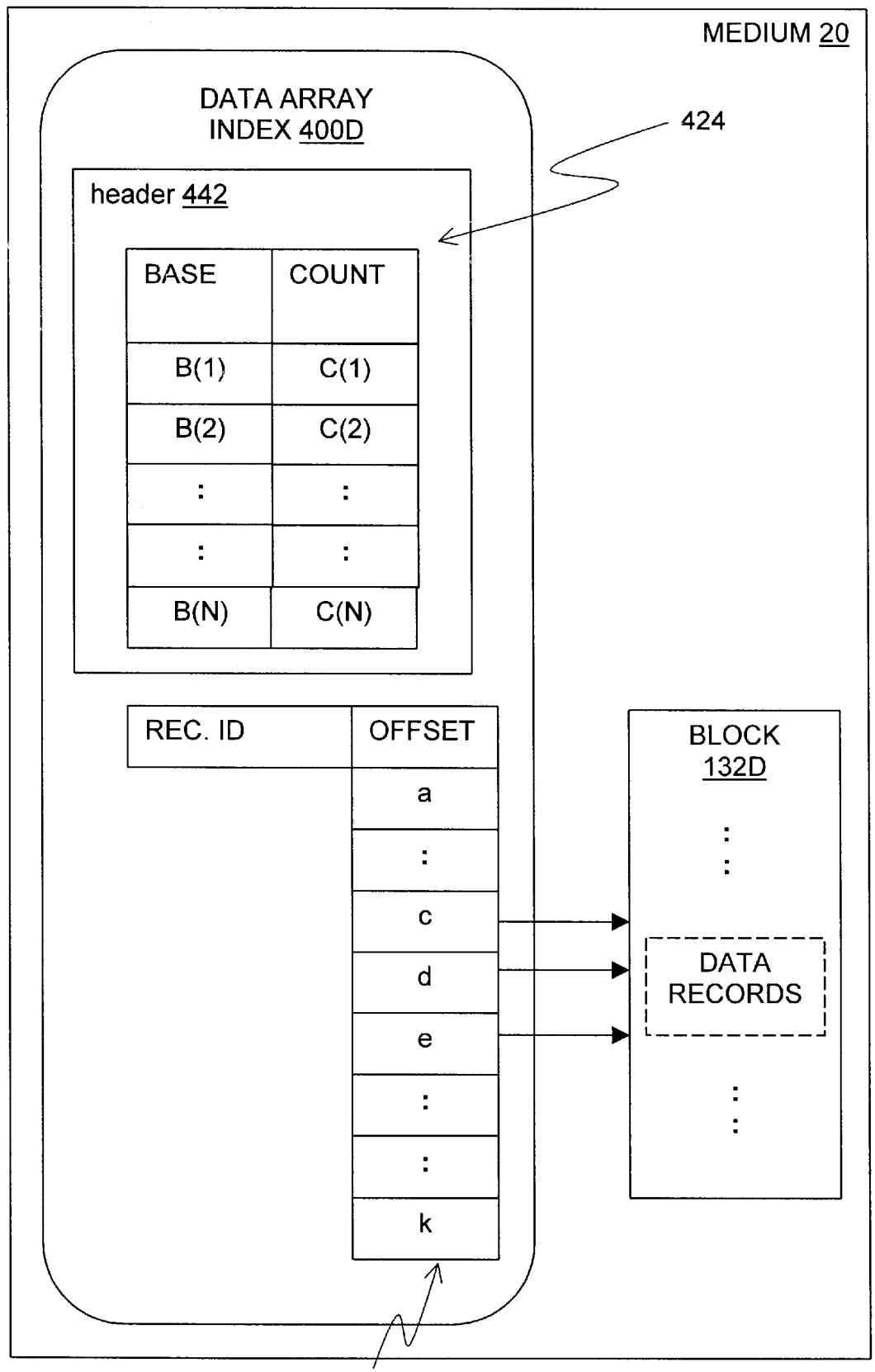
FIG. 6 is a block diagram illustrating a data array like the one in FIG. 4 and containing an alternative representation of the actual data values, wherein the alternative representation is derived using another transformation relationship.

FIG. 6 illustrates still another embodiment for the alternative representation of an original set of source data. The embodiment shown in FIG. 6 can be used if an original set of source data contains actual data values that occur in runs of serially increasing (or decreasing) order. Like the previous embodiments, the embodiment shown in FIG. 6 can be used to reduce the amount of space required to store the information content of the original set of source data.

According to this embodiment, if an original set of source data contains runs of actual data values of serially increasing (or decreasing) order, an alternative representation of the data can be formed by organizing the original data values into groups wherein each of the groups includes a separate run of actual data values that occur in serially increasing (or decreasing) order. For each group, a base value of the group is determined. The base value of a group is determined in a manner similar to the embodiment described above in connection with FIG. 5. For example, the least (smallest) value of a group can be selected as the base value of a group. In addition, for each group a count of the records in the group is determined in a manner similar to the embodiment described in connection with FIG. 5.

As in the previous embodiments, a data array is used to store the alternative representations of actual data values in an original set of data. Referring to FIG. 6, the values of the bases and counts for each of the plurality of groups formed from the original set of actual data values are stored in a data array 400D. The values of the base and count for each group are associated with each other. A table 424 in a header 442 of the data array 400D may be used for this purpose. As shown in FIG. 6, the table 424 stores the values of the bases, B(1), B(2) ... B(N) and the values for the associated counts, C(1), C(2) ... C(N).

Because the actual data values represented by the alternative representations are serial, only the values of the base and the count for each group are stored in the array 400D. Each of the actual data values can be restored from this information. Because values within each group are serial, the value, $V_O$, of an actual data value which is the j'th element of the i'th group can be expressed as $$V_O = B(i) + j, \qquad (3)$$

where B(i) is the base value of the i'th group of the plurality of groups formed of the actual data values and j is the sequence number of $V_O$ within the i'th group relative to the base, B(i). Using the base value and the count for each group, a routine in the data access programming (20 in FIG. 1) can restore the actual data values. Thus, this alternative representation has significant potential for storage space reduction.

As in the previous embodiments, the data array 400D can be used to represent record ID's and offsets to locations in a block of data 132D at which the data associated with corresponding record ID's are located. In FIG. 6, a second set 438 is shown to contain the actual values of the offsets. However in alternative embodiments, the actual values of the offsets can also be replaced using the same type of alternative representation used for the record ID's or a different transformation relationship.

E. Fourth Alternative Representation Formula-vredictive-differences).

Another embodiment for the alternative representation for sets of data is described in connection with FIG. 7. According to this embodiment, the actual data values in an original set of source data are predicted (approximated) using a selected predetermined formula. Then, the original set of actual data values is represented by a set of alternative data values, wherein each alternative data value is the difference by which the corresponding actual data value in the original set of data values differs from a value predicted by the formula. One or more parameters may be calculated or determined (using curve-fitting algorithms known in the art, for example) to predict the original set of actual data values using the formula.

In one embodiment, the selected predetermined formula is defined by a straight line (linear) relationship. The parameters used with the straight line relationship to predict the actual data values include a multiplier and, optionally, a base value. In one embodiment, the multiplier, m, is calculated on a per set basis. In other words, one multiplier is determined for the entire original set of actual data values to be represented by a set of alternative representations. (In an alternative embodiment, more than one multiplier can be defined and used, as described below.) The multiplier, m, defines an approximate amount by which each successive actual data value in the original set changes (e.g., increases or decreases) linearly relative to the previous actual data value. Thus, the multiplier, m, defines the slope of a straight line approximation of the original set of actual data values. A base value, B, can also be determined for the original set of actual data values. The base value can be determined as described above in connection with the previous embodiments. In the embodiment of FIG. 7, the base value represents the vertical displacement of the straight line approximation of the original set of data values. A count, C, of the actual data values in the original set of actual data values is also determined, as described above in connection with previous embodiments.

It can be appreciated that if the original set of actual data values is closely approximated by the straight line defined by the multiplier, m, and the base value, B, the differences by which the actual data values in the original set of data values deviate from the straight line prediction will be relatively small. These differences are used as alternative representations of the actual data values in the set of original data. These differences are included in an array which is stored on the medium.

Figure 7:
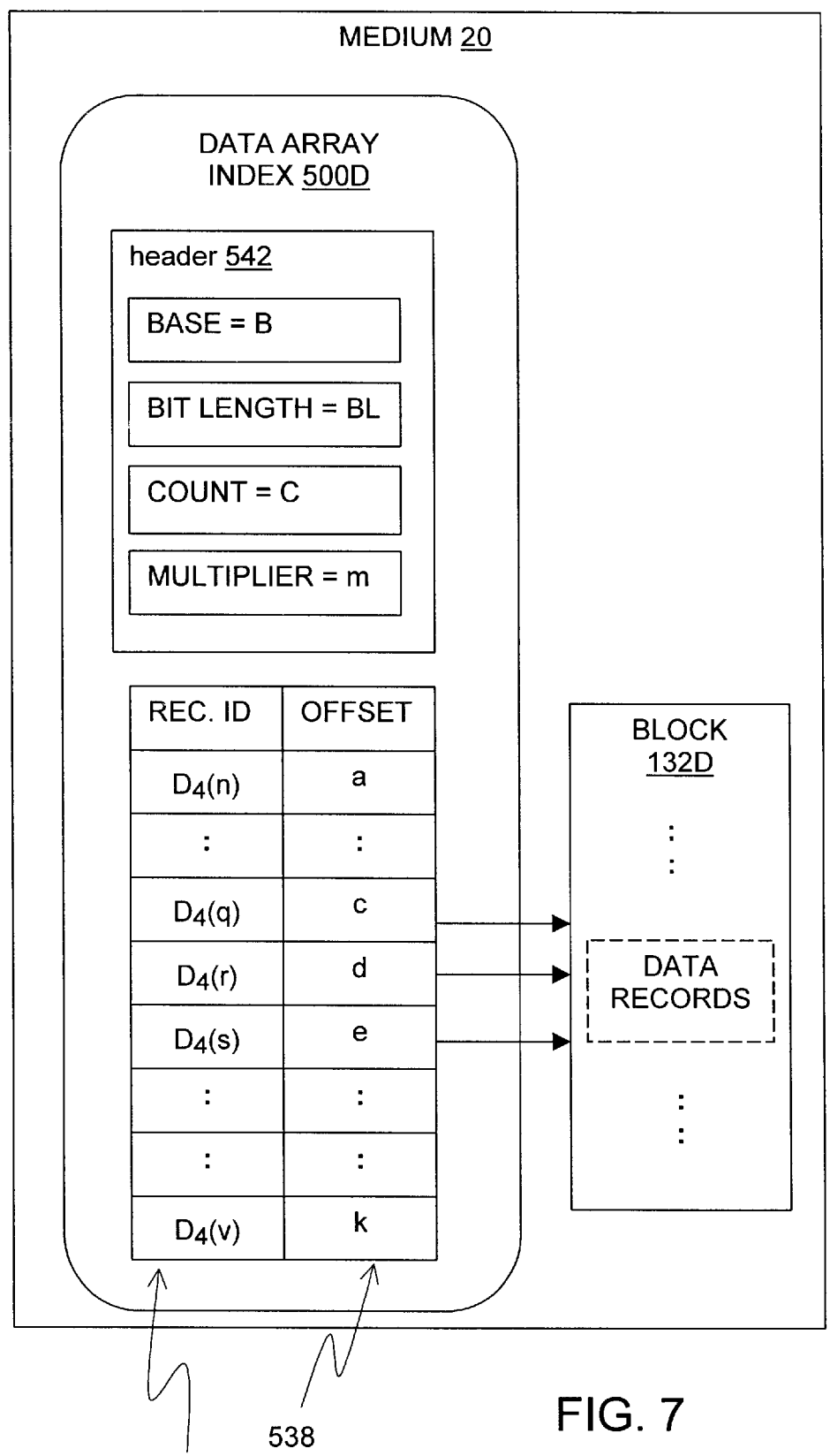
FIG. 7 is a block diagram illustrating a data array like the one in FIG. 4 and in which the data values in the array are alternative representations of the actual data values, wherein the alternative representations are derived using a formula-predictive-differences representation.

FIG. 7 illustrates an implementation of an embodiment that uses this type of alternative representation. As shown in FIG. 7, a data array 500D includes a header 542. The base, B, the count, C, and the multiplier, m, are stored in the header 542. The values of the base, the count, and the multiplier are determined, as described above.

The data array 500D includes a first set 534 of data values. The data values in the first set 534 are alternative representations of the actual data values in the original set of data. As in the previously described embodiments, the data values in the first set 534 are associated with corresponding data values in a second set 538. In the embodiment of FIG. 7, the data values included in the second set 538 are the actual data values but in an alternative embodiment the data values in the second set 538 can be alternative representations of actual data values. (If the data values in the second set 538 are alternative representations, they may be formed using the same transformation relationship used for the first set 534 or a different transformation relationship may be used.) As in the previous embodiments, the data values in the first set 534 may represent record ID's and the data values in the second set 538 may represent offsets to location in a block of data 132D at which the data record associated with the corresponding record ID is located.

The data values in the first set 534 are the differences from the values predicted by the formula defined by the base, the count, and the multiplier. The data values, $D_4$, in the first set 534 are derived using the following relationship, $$D_4(V_O)=V_O-(B+j*m) \tag{4}$$

where $V_O$ is the actual data value in the original set of data, B is the base value, m is the multiplier, and j is the sequence number of the data value, $V_O$, in the count of values in the original set of data. The foregoing representation is referred to herein as the "formula-predictive-differences" representation.

It was stated above that the base value for the formula-predictive-differences representation can be determined as in the previous embodiments. However, when using the formula-predictive-differences representation, it may be preferable to select a base value differently. Instead of selecting the smallest value from the set of actual data values as the base value, it may be preferable to determine a base value such that all the differences of actual values from their corresponding straight line formula predictions have the same sign (i.e., positive or negative). In other words, the base value is selected so that all the differences are positive values (or alternately, all negative values). By selecting a base value so that all the differences have the same sign, the need to store a bit indicating the sign of the difference is eliminated. If a base value is selected in this manner, the base value may not be one of the actual data values in the set of original source data.

Another alternative is to select a base value so that the differences of actual values from their corresponding straight line predictions include both positive and negative values, but that the range of positive differences is approximately equal to the range of negative differences. This representation requires storing a bit to indicate the sign (i.e., positive or negative) of the difference. However, the number of bits required to represent each range is minimized. If a base value is selected so that the range of negative differences from their corresponding straight line predictions is approximately equal to the range of positive differences from their corresponding straight line predictions, the base value may not be one of the actual data values in the original set of source data.

The formula-predictive-differences representation can be combined with one or more of the other alternative representation embodiments described above. For example, the formula-predictive-differences representation can be combined with the embodiment described in FIG. 5 in which the set of actual data values are separated into a plurality of groups, wherein each group has its own base value. If the formula-predictive-differences representation is used with multiple groups, the transformation formula set forth at (4) is modified to take into account more than one base value.

The alternative representations stored using the formula-predictive-differences representation combined with multiple bases, would be the differences defined by the following relationship.

$$D_5(V_O, B_N)=V_O-(B_N(V_O)++j*m) \tag{5}$$

Figure 8:
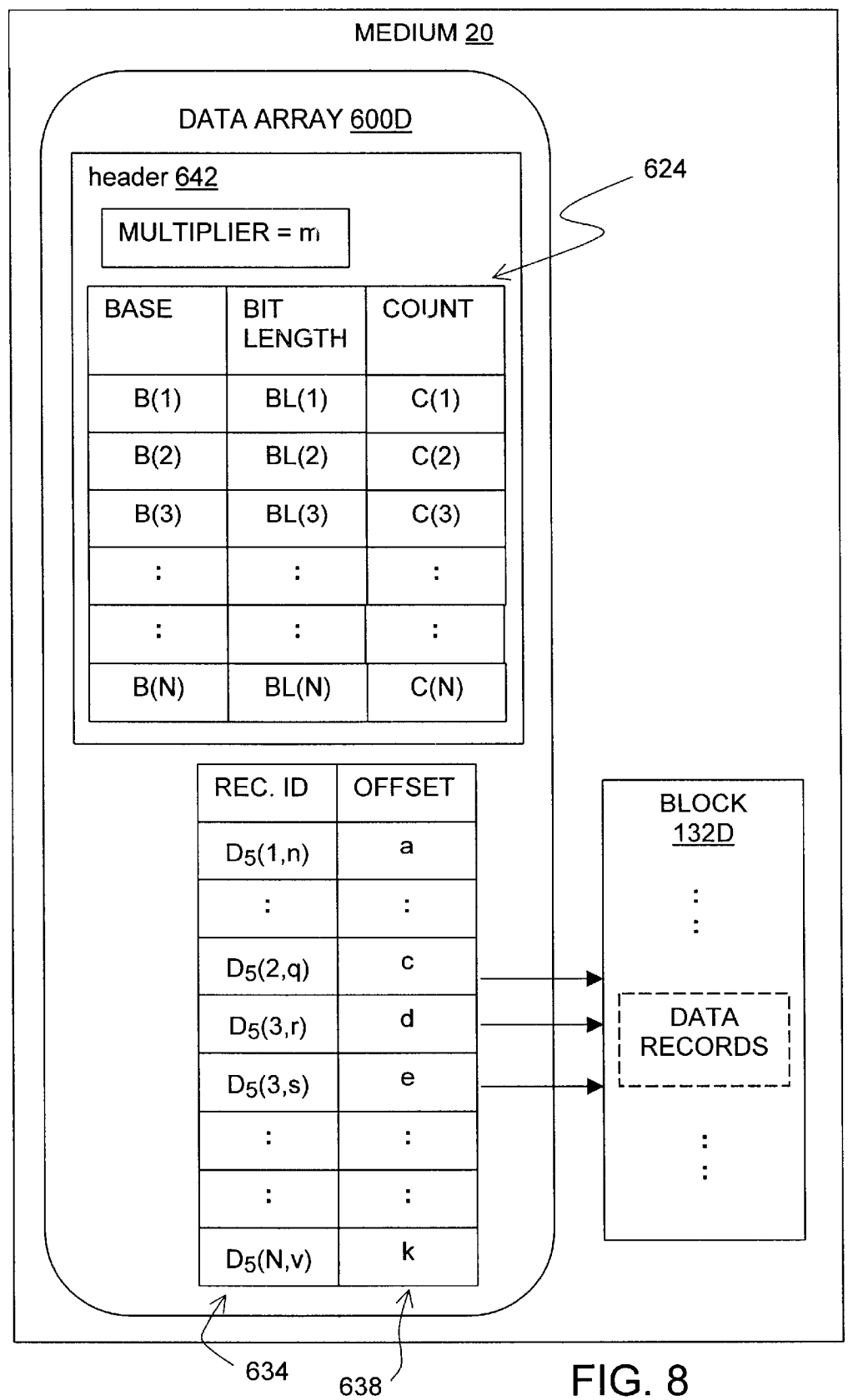
FIG. 8 is a block diagram illustrating a data array like the one in FIG. 7 in which the data values in the array are alternative representations of the source data values, wherein the alternative representations are derived using an version of the formula-predictive-differences representation.

FIG. 8 shows a data array 600D that stores alternative representations using the transformation relationships set forth at (5). In FIG. 8, a header 642 includes a plurality of bases, each of which is associated with a bit length and a count. In the embodiment of FIG. 8, a single multiplier, m, is defined for the entire data array 600D. That is, each of the groups defined by the plural bases uses the same multiplier. The alternative representations stored in the set 634 are the differences relative to the values predicted using the straight line formula (with slope m and offset from each of the bases.)

In another alternative, a separate multiplier, m(i), can be defined for each group defined by a separate base value. In this embodiment, the alternative representations stored are the differences relative to the values predicted using the straight line formula defined for each group, wherein each group has a slope, m(i), and an offset, B(i). These differences are defined as follows:

$$D_6(i,j)=V_O-(B(i)+j* m(i)) \tag{6}$$

In order to restore the actual value, $V_O$, from the stored alternative representation, the following relationship is used.

$$V_O=B(i)+j*m(i)+D_6(i,j). \tag{7}$$

In another example, the actual values in the original source data may be exactly matched by a formula, such as the straight line formula. For example, the actual values in the original source data may increase in perfectly linear (but not necessarily serial) fashion. Then, by computing an appropriate multiplier, m, and storing the value of the multiplier in the header, any data value V can be computed directly using the following relationship.

$$V=B(i)+j*m. \tag{8}$$

(In the foregoing examples of formula-predictive-differences representations, the parameters used in the straight line formulas used to predict the actual data values ,au include one or more of the multipliers, the bases, the bit lengths, and the counts.)

When using the formula-predictive-differences representation with multiple groups (i.e., more than one base and possibly a separate multiplier per group), the selection of the base values and the selection of the number of base values can have an effect on the amount of storage space that can be saved. One way to select the base values from a set of actual data values is described as follows. First, starting with the set of actual data values, a set of differences is determined. The set of differences includes the difference between each actual value and the immediately subsequent actual value. From this set of differences, the largest differences are identified. The values between these largest differences determine the groups. The base values can be selected as those actual data values that represent the largest jumps from the immediately previous actual value. Once the groups are determined, a multiplier is selected for each group. The multiplier can be selected that minimizes the differences of the actual values relative to the straight line prediction defined by the multiplier. Alternatively, the base values and multipliers can be selected so that all the differences have the same sign, or that the range of positive differences approximately equals the range of negative differences. Other approaches for selecting groups and/or multipliers may be used.

In alternative embodiments using the formula-predictive-differences representation, other-than-linear formulas can be used to define predictions (approximations) of the original data values. For example, higher order formulas or logarithmic formulas may be used. If an other-than-linear formula is used to approximate the actual data values in the set, the amount by which each actual data value in the original source data differs from the value approximated by the other-than-linear formula is stored in the array which is stored on the medium in the same manner as in the previously described embodiment(s). If an other-than-linear formula is used to predict the data values in the set, the other-than-linear formula may be identified in the header. Likewise, the parameters used to fit the other-than-linear formula may also be stored in the header.

The formula-predictive-differences representation has several advantages. First, the formula-predictive-differences representation does not take more bits than the simple-base-relative representation. Usually, the formula-predictive-differences representation takes less storage space than the simple-base-relative representation. Another advantage is that the formula-predictive-differences representation takes no bits at all if the actual data values increase linearly (as illustrated in FIG. 6).

Another advantage of the formula-predictive-differences representation is that it can share the same header structure as the simple-base-relative representation if the multiplier, m, is set to zero. Further, the formula-predictive-differences representation is also compatible with straight value representation if all the header parameters are set to zero.

Another advantage of the base-relative positional-prediction differences representation is that binary search techniques can be used on the alternative representations included in the arrays thereby allowing values to be found quickly.

In another alternative, the differences determined using the formulas at (4), (5), (6), above, can be made base-relative (in the manner described above in connection with FIG. 4). This may reduce the number of bits needed to represent the range, thereby saving further space. The base-relative representations of the differences can be applied to the entire set of data values in the array or can be made per-group basis.

The formula-predictive-differences representation is especially useful for variable-bit-length fields.

III. Access and Use of Data

In order to use data that has been stored using an alternative representation to satisfy a request that includes actual data values, either of two processes is performed. First, the actual data values in the request can be transformed into the format of the alternative representation or second, the data stored in the format of the alternative representation can be transformed back into the format of the actual data values in the source data from which they were formed. The programming (20 in FIG. 1) that accesses the data from the storage medium 16 may include additional steps to provide either or both these functions. In one embodiment, the programming 20 transforms the actual (non-transformed) data value(s) included in the request into the form of the alternative representation used for the stored data. Then, with both the data value(s) from the request and the stored data values from the medium in the form of the same alternative representation, the request can be handled, for example to find other data on the medium. Alternatively, in another embodiment, upon receiving a request that includes actual (non-transformed) data values, the programming 20 transforms the data values that are stored on the medium in the form of an alternative representation back into the actual data values that they represent. Then, these restored data values are used with the data values(s) included in the request.

Figure 9:
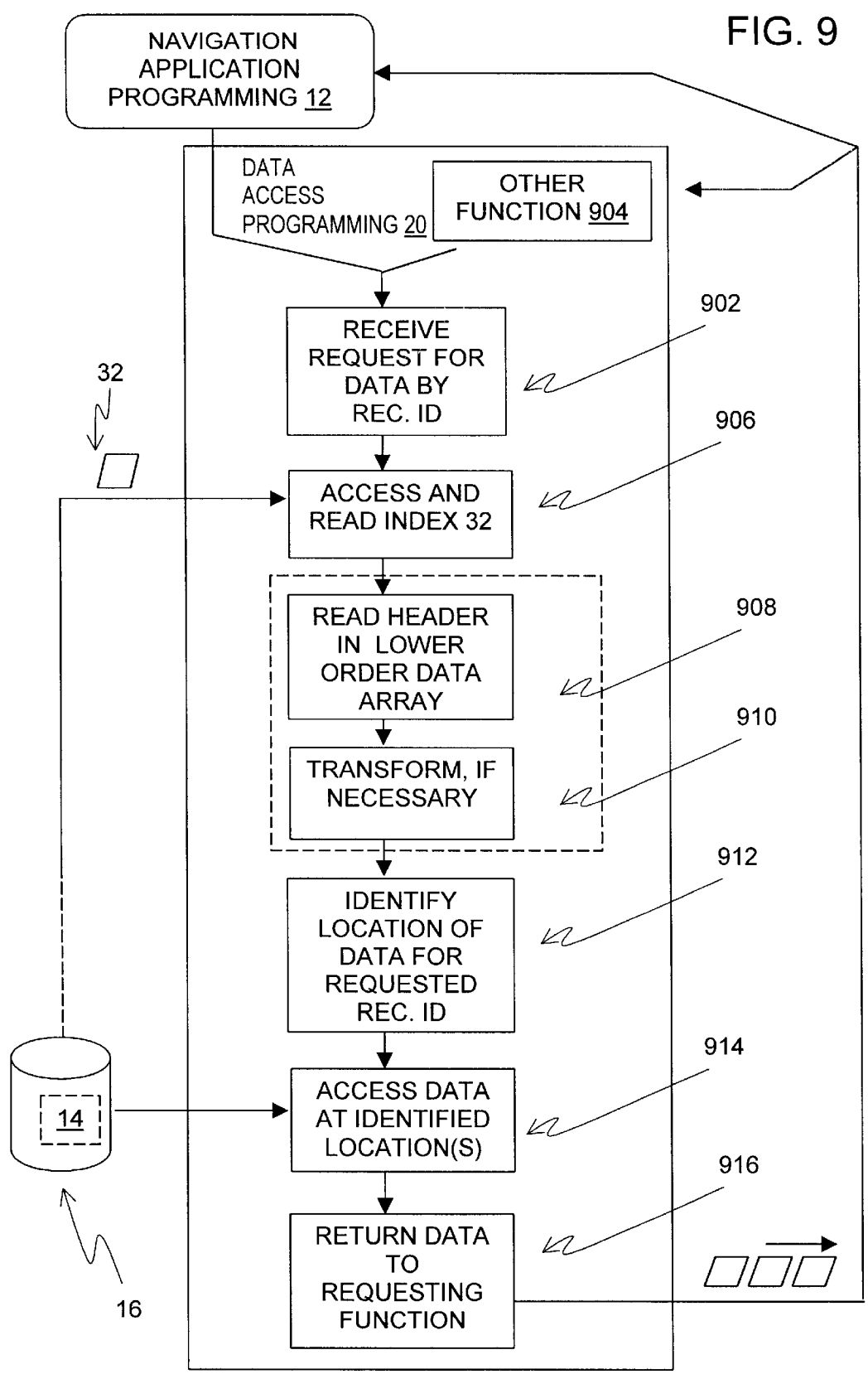
FIG. 9 is a flow chart illustrating programming steps performed by a routine included in the data access programming of FIG. 1 that restores the actual source data values from the alternative representations thereof.
Figure 10A:
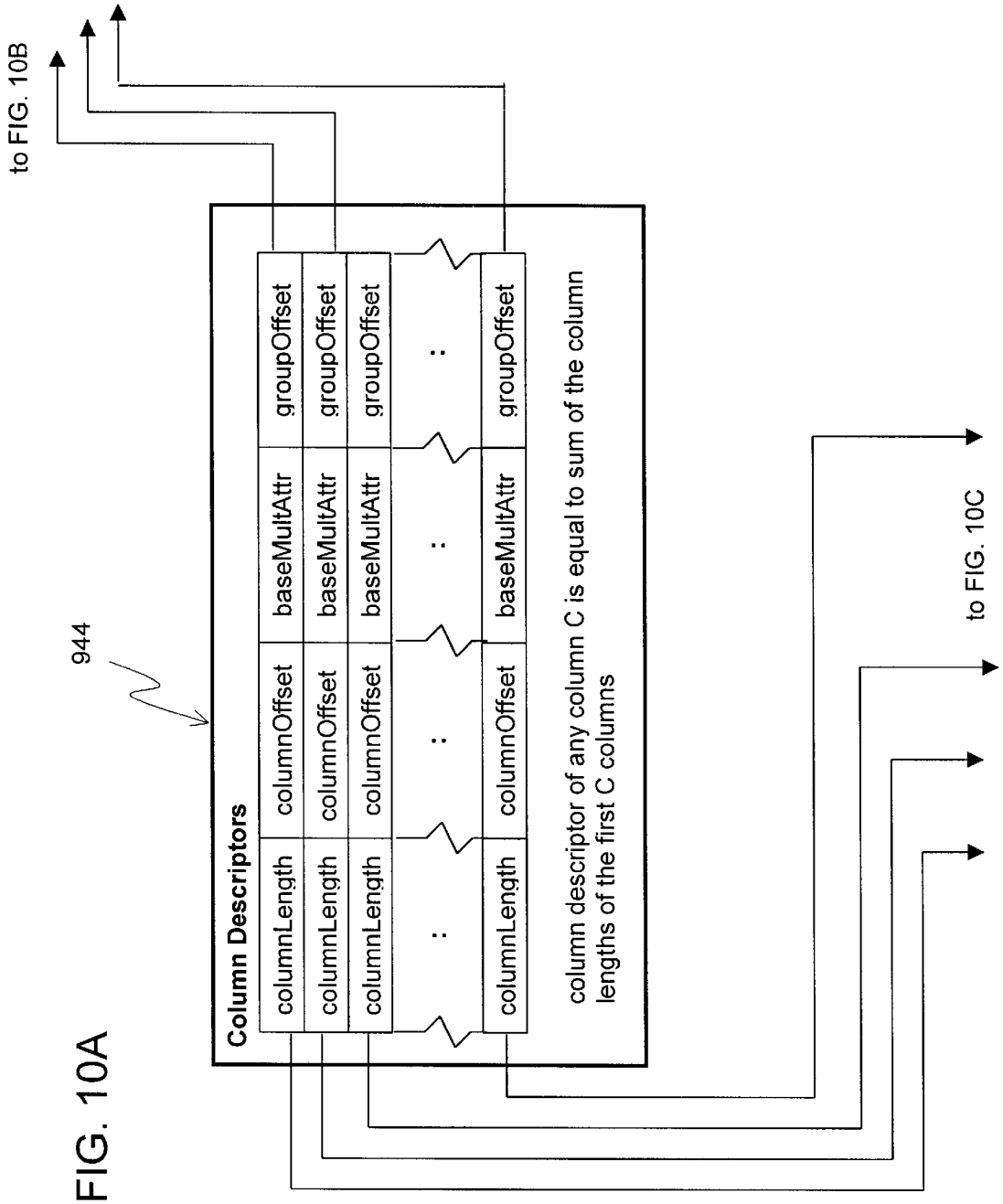
FIGS. 10A, 10B, 10C, and 10D are a block diagram illustrating an exemplary embodiment using the alternative representation process described in connection with FIG. 8.
Figure 10B:
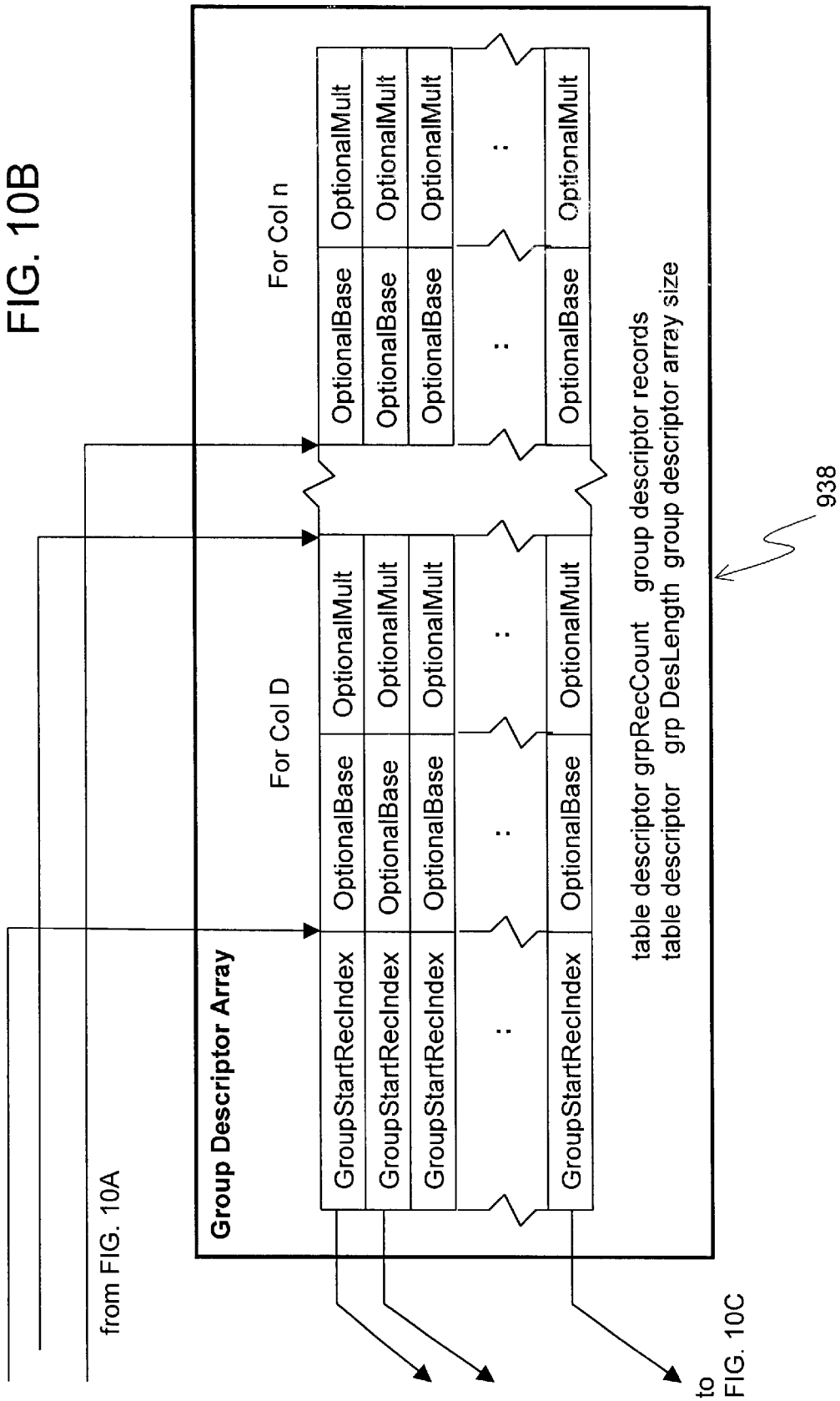
Figure 10C:
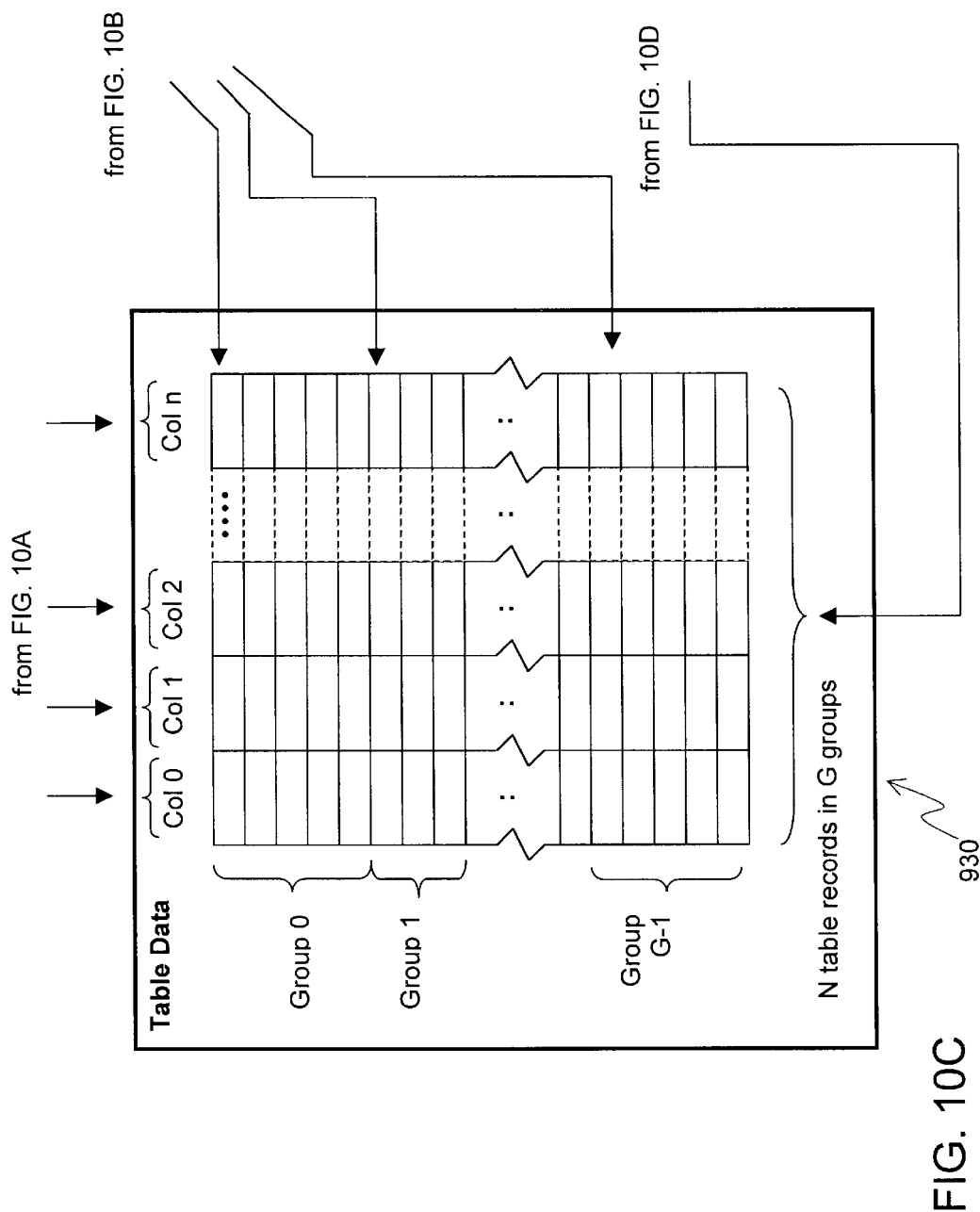
Figure 10D:
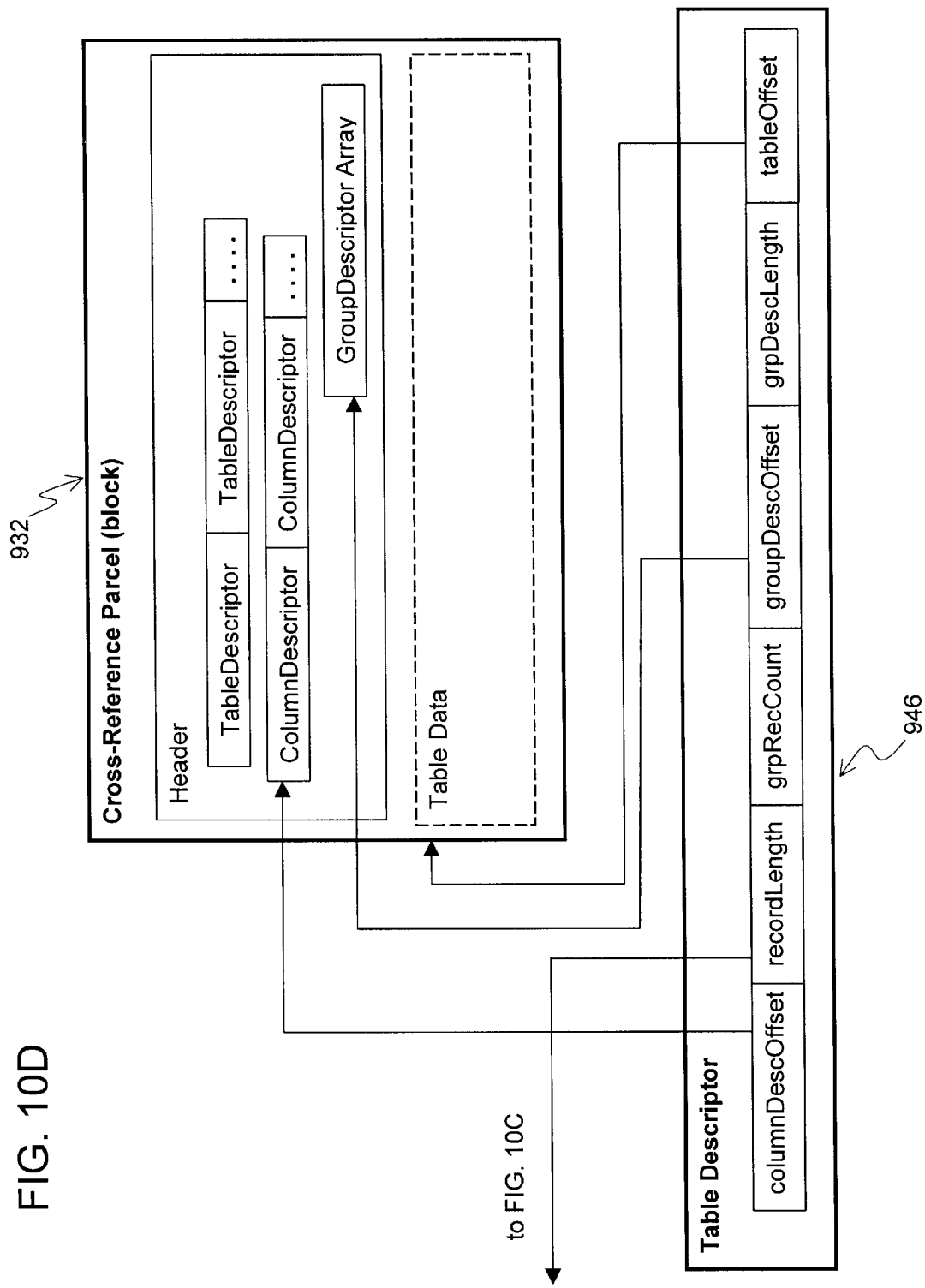

FIG. 9 is a flow chart that includes steps performed by the data access programming 20 in order to use data stored using an alternative representation. In FIG. 9, a request is received for data identified by record ID (Step 902). The request may be received from a function in the navigation application programming 12 or the request may come from another function 904 in the data access programming 20. The data access programming 20 performs the steps of accessing and reading the appropriate index 32 (Step 906). The index 32 may be read from the media 16 at this time or alternatively, the index 32 may be read from the media 16 at initialization of the navigation system 10 and maintained in memory. If necessary, the higher order data array 100Z (in FIG. 2) is used to identify, access and read the appropriate lower order index, e.g., 100A, 100B, etc.

After the index 32 is accessed, the header (e.g., 242 in FIG. 4, 342 in FIG. 5, 442 in FIG. 6, 542 in FIG. 7 or 642 in FIG. 8) in the lower order index array is read (Step 908). Based upon the data included in the header, the data values in the array are transformed to restore them to their original values (Step 910). (Alternatively, the value of the record ID received in Step 902 is transformed into the alternative representation of the stored data.)

After the transformation, the location of the data corresponding to the requested record ID is obtained from the lower order array (Step 912). Using the identified location, the requested data is accessed (Step 914). The accessed data is returned to the requesting application (Step 916).

The foregoing example illustrates only one way in which the data stored in the alternative representations can be used. It is appreciated that the transformation steps (908 and 910) can be done at any time, such as at initialization or as a background task in advance of when the data is needed.

As mentioned above, the formula-predictive-differences representation, especially the version used with multiple bases, is relatively versatile. Each of the different types of alternative representations described above can be formed by appropriate selection of the parameters used with the (straight line) formula. For example, defining only a single base and setting the multiplier to zero is equivalent to the simple-base-relative representation (FIG. 4). Defining plural bases and setting the multiplier to zero is equivalent to the multiple bases representation (FIG. 5). Defining plural bases and at 12 setting the multiplier to one is equivalent to the representation for serial values (FIG. 6) if all the differences are zero. In one embodiment, any or all of these various types of alternative representation can be used in a single database. The determination of which alternative representation to use can be based upon which provides the greatest savings in the amount of storage space required. When the data access programming reads the header, the parameters in the header determine which of the various alternative representations are used. Thus, the implementation is very versatile.

IV. Exemplary Embodiment

In an exemplary embodiment, the base-relative-formula-predictive-differences representation is applied to all the columns (i.e., fields) of a main multi-column data table (i.e., two-dimensional data array), with the rows (i.e., records) of the table being aggregated into groups according to the values in one of its columns. FIGS. 10A–10D illustrate a multi-column data table (labeled 930 in FIG. 10C) implemented according to this embodiment. The multi-column data table 930 is used as an index to cartographic data records located in a parcel (i.e., block) of data (labeled 932 in FIG. 10D).

In this embodiment, each column of the table 930 comprises a set of data values that are represented using the transformation relationship at (6), above. The table rows (i.e., records) are sorted into order (ascending or descending) using the column that is to be used to decide the grouping as the first sort key. Other columns may be used as second and subsequent sort keys. The choice of columns to be used for sorting and grouping can be made by using either manual or automated analysis. This analysis can take into account tradeoffs between resultant array size and speed. For example, bits saved in the main array table may be offset by bits added to the description of the group (i.e., the group descriptor array). These savings can be exactly computed. Speed considerations can be estimated. The analysis of which columns to be used for sorting can also take into account other considerations. For example, a column may be selected for sorting if it is to be used for binary searches.

In this embodiment, a separate array of group descriptor records (labeled 938 in FIG. 10B) is used to store the set of parameters needed to employ the formula-predictive-differences embodiment for each record group. For example, the separate array of group descriptor records may include the sequence number (j) of the first row of the group, and the base (B) value and multiplier (m) value for each column over the range of the group. For convenience, this array of group descriptor records may be terminated by a dummy record. The dummy record includes a first-row sequence number field that includes the total count of rows in the main table. Otherwise, this count may be provided elsewhere.

For flexibility in group descriptor record formatting, a separate array of column descriptors (labeled 944 in FIG. 10A) is used to store for each column of the table the bitlength of that column and its bit-offset within each row, and other information, in order to allow the use of variable-length representations for the formula-predictive-differences parameters for that column in each group. In one embodiment, this information provides the offsets and byte-lengths of the base and multiplier values for the column in the group descriptor record, the position of the binary point in the multiplier, and a flag indicating whether the multiplier has a sign bit. (Base and multiplier values default to zero and one, respectively, if their byte-lengths are specified as zero.) A separate table descriptor (labeled 946 in FIG. 10D) stores at least the minimal information needed to locate the main data table 930, the group descriptor array 938, and the column descriptor array 944, plus a record count for the group descriptor array. The column count and other information used to interpret the column descriptor array and to perform the formula-predictive-differences computation for each column may be provided within the database, for example in a metadata translation table, a data dictionary, or elsewhere in the database. Alternatively, the column count and other information used to interpret the column descriptor array and to perform the formula-predictive-differences computation for each column may be otherwise provided in the extraction software (i.e., data access programming 20 in FIG. 1).

In the embodiment described above, the bitlengths of the columns are provided in the column descriptors and so are common to all groups. This simplifies and speeds processing by making all main table records the same length. This also reduces group descriptor record size, but it does not minimize space if some groups require much greater bitlengths than others. An alternative embodiment would be to provide the bitlength for each column in the group descriptor instead and minimize column bitlengths on a per-group basis. Yet another alternative would be to use per-table and per-group column bitlength descriptors in various combinations, and add to each table descriptor a description of the combination used. Either automated or manual analysis could be used to determine the combination to be used for any particular table or set of tables. It is possible to compute whether the number of bits saved in the main table will be greater than the number added to the various descriptors. The effect of these alternatives on the processing time to restore the actual data values from the alternative representations can be estimated.

In another alternative embodiment, if for some reason it is found advantageous that a particular main data table not be divided among a plurality of groups, and that a base value of zero and a multiplier of one be assumed for all columns of the table, then the group descriptors can be omitted. This can be indicated by some means in the table descriptor (e.g., by giving a value of zero for the group descriptor array offset). Then, the group descriptor record count field of the table descriptor can be interpreted as the main table row count.

Operation

As in the previously described embodiments, data values that have been stored using the alternative representation described in connection with FIGS. 10A–10D may be converted back into the actual data values from which they were formed prior to being used. Programming (20 in FIG. 1 or FIG. 9) in the navigation system may be used for this purpose.

First, the table descriptor 946 is retrieved. Using the location information in the table descriptor 946, the column descriptor array 944 is retrieved. The following data is extracted from the column descriptors array 944: the column bitlengths, the lengths of the base value and multiplier value representations in the group descriptor records, and the offsets from the start of record to the base values and multiplier values.

Using the location information from the table descriptor 946, the group descriptor array 938 is retrieved. The sequence number (e.g., "k") of the record to be examined is selected. (The selection of the sequence number is determined by the particular search strategy being used.) The bit-address of the start of the record "k" is found in the main table 930 using the information from the table descriptor 946 and column descriptor 944. For example, this bit-address may be determined from the table start address plus "k" times the total of the column bitlengths.

The first-record sequence numbers in the group descriptor are scanned to find the group "i" containing the record "k". If the column descriptor specifies zero length for the base or multiplier, then the default (0 or 1.0) is used. Otherwise, column 0 base and multiplier from the group descriptor "i" are extracted.

Next, the bits containing the difference value for column 0 in record "k" are extracted from the main table 930. After this step, j=k−i is computed (i.e., the position of "k" within group "i"). The original value $V_{0O}$ of field 0 is computed from $V_{0O}(k)=D0(k)+B0(i)+j*m0(i)$.

Then $V_{0O}(k)$ is compared to a target value. If they are equal, then the other field values, e.g., $V_{1O}(k)=D1(k)+B1(i)+j*m1(i)$, are extracted. If they are not equal, the process may be continued or aborted per the search strategy.

V. Alternative Platforms

Embodiments of the disclosed methods for alternative representation of stored data can be used in apparatuses other than navigation systems. For example, the disclosed methods for alternative representation of data can be used in personal digital assistants (such as PalmPilot®-type devices), portable electronic encyclopedias, portable spell-checkers, etc.

It is intended that the foregoing detailed description be regarded as illustrative rather than limiting and that it is understood that the following claims including all equivalents are intended to define the scope of the invention.

I claim:

1. A method of providing for a compact representation of data in a database used by a computer-based system comprising:

determining at least one parameter value by which a predefined formula approximates a first set of actual data values contained in said database; and using a computer program to store an alternative representation of said first set of actual data values in a data construction to form a compact representation of said database, wherein said alternative representation comprises a difference between each actual data value in said first set and a value predicted therefor by said predefined formula.

2. The method of claim 1 further comprising the step of:
storing said data construction on a computer-readable medium.

3. The method of claim 1 further comprising the step of:
storing a group descriptor array with said alternative representation, wherein said group descriptor array contains a plurality of parameter values including a plurality of base values and at least one multiplier value.

4. The method of claim 1 further comprising the step of:
storing a group descriptor array with said alternative representation, wherein said group descriptor array contains a plurality of parameter values including a plurality of base values and a plurality of multiplier values, wherein each multiplier value of said plurality of multiplier values is associated with a respective one base value of said plurality of base values.

5. The method of claim 1 further comprising the step of:
storing an alternative representation of a second set of actual data values in said data construction, wherein said alternative representation of said second set of actual data values is associated with said alternative representation of said first set of actual data values in said data construction.

6. The method of claim 1 wherein said predefined formula comprises a linear relationship.

7. The method of claim 6 wherein said at least one parameter value comprises a multiplier, wherein said multiplier predicts an amount by which each succeeding data value in said first set of actual data values changes according to said linear relationship.

8. The method of claim 6 wherein said at least one parameter value comprises a base value, wherein said base value comprises a minimum actual value of all values in said first set.

9. A geographic database comprising an index including data values that are alternative representations of actual data values, wherein said data values in said index are formed according to the method of claim 1.

10. The geographic database of claim 9 wherein said index associates geographic record ID's with locations on a storage medium at which data associated with said geographic record ID's is located.

11. A geographic database stored on a computer-readable medium, comprising:

geographic data values that are alternative representations of actual data values, wherein said data values are formed according to the method of claim 1.

12. A data construction in a database stored on a computer-readable physical storage medium comprising:

at least one parameter by which a formula predicts each value of a plurality of actual data values in an original source of data in a database; and for each actual data value of said plurality of actual data values, an alternative representation value therefor stored in a compact representation of the database, wherein said alternative representation value comprises a difference by which said actual value in said plurality of actual data values differs from a value predicted therefor according to said formula.

13. The invention of claim 12 wherein said plurality of actual data values are record ID's.

14. The invention of claim 12 further comprising:
an identification of a base value, wherein said base value is equal to a smallest value of said plurality of actual data values in said original source of data.

15. The invention of claim 12 further comprising:
an identification of a base value, wherein said base value is selected so that each difference by which an actual data value differs from the value predicted therefor by said formula has the same sign.

16. The invention of claim 12 further comprising:
an identification of a base value, wherein said base value is selected so that a range of positive differences is approximately equal to a range of negative differences.

17. The invention of claim 12 wherein said at least one parameter comprises:

at least one base value; and at least one multiplier value by which each succeeding data value in said first set of actual data values is approximated by said formula.

18. The invention of claim 12 further comprising:
a plurality of base values, wherein each base value of said plurality of base values is associated with a separate respective one of a plurality of groups of actual data values formed from said plurality of actual data values in the original source of data, and wherein each base value.

19. The invention of claim 18 further comprising:
a plurality of multipliers, wherein each multiplier of said plurality of multipliers is associated with a separate respective one of said plurality of groups, and wherein each multiplier is a value that approximates an amount for the group by which each succeeding actual value in the group changes relative to an immediately preceding actual value.

20. The invention of claim 12 wherein said at least one parameter comprises a multiplier that predicts an amount by which each actual value in said plurality of actual data values changes relative to an immediately preceding actual value.

21. The invention of claim 12 wherein said at least one parameter comprises:

at least one base value, wherein said at least one base value is selected so that each difference by which an actual data value differs from the value predicted therefor by said formula has the same sign; and a multiplier that predicts an amount by which each actual data value in said plurality of actual data values changes relative to an immediately preceding actual data value.

22. A method of using a data construction in a database used by a program executed on a computer platform, the method comprising the steps of:

reading at least one parameter from a header of the data construction;

using said parameter with a predetermined formula to determine a prediction of each of a plurality of actual data values;

reading a plurality of differences contained in said data construction; and for each difference of said plurality of differences contained in said data construction, adding the difference to the prediction obtained by using said formula to thereby obtain the actual data value represented thereby in said database.

* * * * *